US010921900B1

(12) United States Patent
Linden et al.

(10) Patent No.: US 10,921,900 B1
(45) Date of Patent: Feb. 16, 2021

(54) VEHICLE CLOSURE PANEL CONTROL ASSEMBLY AND METHOD

(71) Applicant: Ford Global Technologies, LLC, Dearborn, MI (US)

(72) Inventors: Howard Paul Tsvi Linden, Southfield, MI (US); Onoyom Essien Ekanem, White Lake, MI (US); Marc Beeman, Grosse Pointe Woods, MI (US); Christopher Matthew Radjewski, Macomb Township, MI (US); Kristopher Karl Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/672,032

(22) Filed: Nov. 1, 2019

(51) Int. Cl.
| | |
|---|---|
| *E05F 15/73* | (2015.01) |
| *B60Q 1/32* | (2006.01) |
| *B60R 1/12* | (2006.01) |
| *G01S 13/93* | (2020.01) |
| *G06F 3/01* | (2006.01) |
| *B60R 25/01* | (2013.01) |
| *B60R 25/20* | (2013.01) |
| *B60J 5/10* | (2006.01) |
| *G06K 9/00* | (2006.01) |
| *G07C 9/00* | (2020.01) |

(52) U.S. Cl.
CPC ............. *G06F 3/017* (2013.01); *B60J 5/102* (2013.01); *B60J 5/107* (2013.01); *B60R 25/01* (2013.01); *B60R 25/2045* (2013.01); *G06K 9/00355* (2013.01); *G07C 9/00563* (2013.01)

(58) Field of Classification Search
CPC combination set(s) only.
See application file for complete search history.

(56) References Cited

U.S. PATENT DOCUMENTS

| | | | |
|---|---|---|---|
| 9,499,125 B2 | 11/2016 | Akay et al. | |
| 2018/0170309 A1 | 6/2018 | McMahon et al. | |
| 2020/0157873 A1* | 5/2020 | Sabatini | .................. G01S 7/415 |

FOREIGN PATENT DOCUMENTS

| | | |
|---|---|---|
| CN | 107719303 A | 2/2018 |
| JP | 2013028903 A | 2/2013 |

OTHER PUBLICATIONS

Rufford, Nick, "Gesture Control Waves Goodbye to Car Door Handles," The Sunday Times, Apr. 20, 2014, Times Newspapers Limited 2019, England.

\* cited by examiner

*Primary Examiner* — Deeprose Subedi
(74) *Attorney, Agent, or Firm* — David Coppiellie Esq.; Carlson, Gaskey & Olds, P.C.

(57) ABSTRACT

A vehicle closure panel control assembly includes, among other things, a closure panel, an actuator system that can move the closure panel back and forth between an open position and a closed position, a positional sensor that senses a position of at least part of a user to detect a user gesture, and a control module that commands the actuator system to control movement of the closure panel. The commands from the control module to the actuator system are based at least partially on the user gesture.

18 Claims, 5 Drawing Sheets

VEHICLE CLOSURE PANEL CONTROL ASSEMBLY AND METHOD

TECHNICAL FIELD

This disclosure relates generally to controlling movement of a vehicle closure panel, such as a side door, based on a user gesture.

BACKGROUND

A vehicle can include one or more closure panels. Exemplary closure panels are doors and liftgates. Generally, closure panels can move back and forth between open and closed positions relative to a body structure of the vehicle. Some closure panels can be moved with actuators, such as power hinges.

SUMMARY

A vehicle closure panel control assembly according to an exemplary aspect of the present disclosure includes, among other things, a closure panel, an actuator system that can move the closure panel back and forth between an open position and a closed position, a positional sensor that senses a position of at least part of a user to detect a user gesture, and a control module that commands the actuator system to control movement of the closure panel. The commands from the control module to the actuator system are based at least partially on the user gesture.

In another example of the foregoing vehicle assembly, the closure panel is a door.

In another example of any of the foregoing vehicle assemblies, the actuator system includes at least one power hinge.

In another example of any of the foregoing vehicle assemblies, the positional sensor emits radio waves.

In another example of any of the foregoing vehicle assemblies, the positional sensor includes a RADAR sensor.

In another example of any of the foregoing vehicle assemblies, the RADAR sensor is a short-range RADAR sensor in the 77 gigahertz band.

In another example of any of the foregoing vehicle assemblies, the commands from the control module to the actuator system change based on the user gesture.

In another example of any of the foregoing vehicle assemblies, the control module is configured to command the actuator system to move the closure panel to the open position in response to a user gesture of a first type, to move the closure panel to the closed position in response to a user gesture of a second type, and to stop movement of the closure panel in response to a user gesture of a third type.

In another example of any of the foregoing vehicle assemblies, the first type, the second type, and the third type are each a different type of hand gestures.

In another example of any of the foregoing vehicle assemblies, the user gesture of the first type is a movement of a hand of a user when the hand is in a pointing position. Also, the user gesture of the second type is the hand in a cupped position and the user gesture of the third type is the hand with an open palm.

In another example of any of the foregoing vehicle assemblies, a vehicle includes the vehicle assembly.

A vehicle closure panel control method according to another exemplary aspect of the present disclosure includes sensing a gesture made a user by detecting a position of at least a portion of the user, and controlling a position of a closure panel in response to the gesture.

In another example of the foregoing method, the closure panel is a side door of a vehicle.

Another example of any of the foregoing methods includes sensing the gesture using RADAR.

Another example of any of the foregoing methods includes sensing the gesture using a short-range RADAR sensor in the 77 gigahertz band.

In another example of any of the foregoing methods, the controlling includes moving the closure panel using at least one power hinge.

In another example of any of the foregoing methods, the controlling includes moving the closure panel to a more open position in response to a user gesture of a first type, moving the closure panel to a less open position in response to a user gesture of a second type, and stopping movement of the closure panel in response to a user gesture of a third type.

In another example of any of the foregoing methods, the first type of user gesture is a movement of a hand of a user when the hand is in a pointing position.

In another example of any of the foregoing methods, the second type of user gesture type is a hand of a user in a cupped position.

In another example of any of the foregoing methods, the third type of user gesture is a hand with an open palm.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to controlling a closure panel of a vehicle. Examples of the controlling can include, for example, automatically moving the closure panel to a more open position, automatically moving the closure panel to a less open position, or stopping a movement of the closure panel. The controlling is based on user gestures, such as hand gestures.

Figure 1:
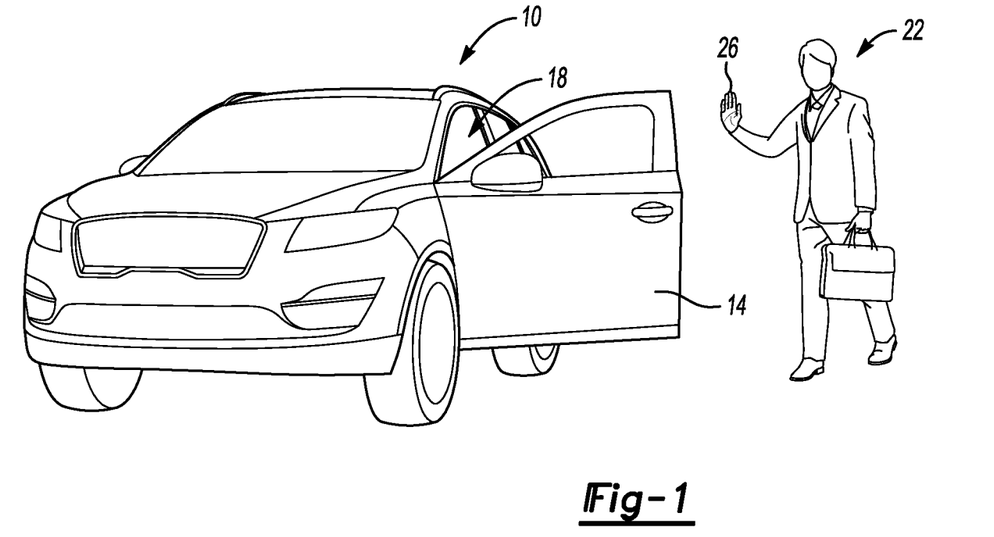
FIG. 1 illustrates a vehicle having a closure panel being controlled based, in part, on a user gesture made by a user.

With reference to FIG. 1, an example vehicle 10 includes a closure panel, here a side door 14. Other exemplary closure panels of a vehicle could include a liftgate or a tailgate.

The side door 14 is shown in an open position. The side door 14 can move between the open position shown and a closed position where the side door 14 covers an opening 18 to a passenger compartment of the vehicle 10.

In the exemplary embodiment, the side door 14 has stopped moving from an open position to a more open position due to the vehicle 10 detecting a user gesture made by a user 22. In the exemplary embodiment, the user gesture that is detected is the user's hand 26, as shown, being extended upward with four fingers closely together and the palm facing the vehicle 10.

In the exemplary embodiment, the vehicle 10 has stopped movement of the side door 14 based on the user gesture shown in FIG. 1. The user gesture is thus used to control operation of the side door 14.

A positional sensor of the vehicle 10 can be utilized to detect the position of the user's hand 26 and the corresponding user gesture. For purposes of this disclosure, a user gesture refers to the user's hand 26 being in a particular position relative to the vehicle 10. The user gesture could further require, in some examples, the user's hand 26 to move in a certain way while being in a particular position. Although the exemplary user gestures are provided by the user's hand 26, other examples could rely on other parts of the user 22, such as the user's foot.

Figure 2:
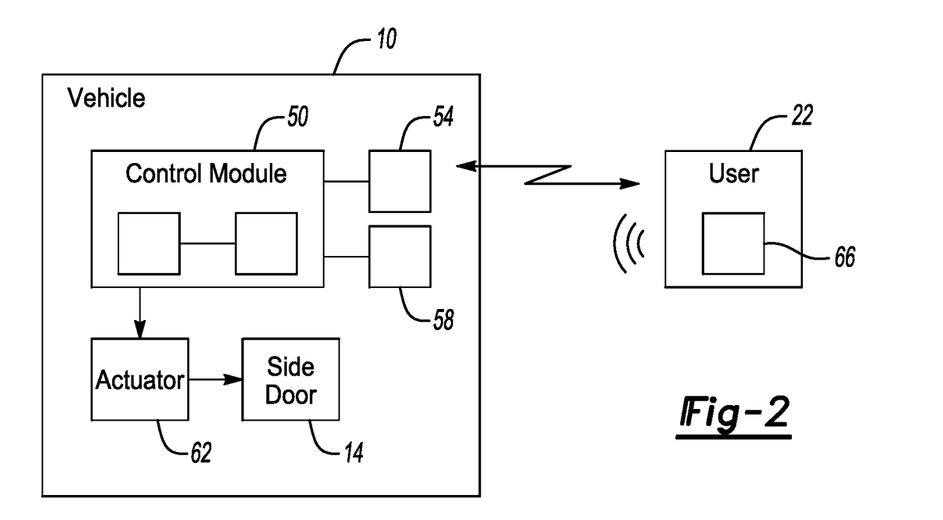
FIG. 2 illustrates a highly schematic view of the vehicle and the user from FIG. 1.

With reference to FIG. 2, the vehicle 10 includes, among other things, a control module 50, a positional sensor 54, an authorization sensor 58, an actuator system 62, and the side door 14. The control module 50 is operatively linked to at least the positional sensor 54, the authorization sensor 58, and the actuator system 62. The remaining side doors and other closure panels of the vehicle 10 can be associated with the control module 50. The control module 50 can be further operatively linked to actuator systems and authorization sensors associated with the remaining side doors and other closure panels of the vehicle 10.

In the exemplary embodiment, the positional sensor 54 includes a RADAR sensor. In particular, the positional sensor 54 can be a RADAR sensor in the 77 gigahertz band (from 76 to 81 gigahertz). The positional sensor 54 can be a single sensor or an arrangement of sensing devices. The positional sensor 54 can be mounted within an exterior door handle of the vehicle 10. The positional sensor 54, in the exemplary embodiment, is a short-range sensor, such as a positional sensor that recognizes gestures made by the user's hand 26 when the user's hand 26 is from 100 mm to 350 mm away from the positional sensor 54.

In the exemplary embodiment, the positional sensor 54 is configured to emit radio waves toward the user 22. Some of the radio waves are reflected back to the positional sensor 54. Based on the reflected signals, the control module 50 can recognize user gestures.

While schematically illustrated as a single control module 50, the control module 50 may be part of a larger control system that may be controlled by various other controllers throughout the vehicle, such as a vehicle system controller (VSC). It should therefore be understood that the control module 50 and one or more other controllers can collectively be referred to as a control module that controls, such as through a plurality of interrelated algorithms, the side door 14 or other closure panels based on user gestures.

The exemplary control module 50 can include a microprocessor or central processing unit (CPU) in communication with various types of computer readable storage devices or media. Computer readable storage devices or media may include volatile and nonvolatile storage and read-only memory (ROM), random-access memory (RAM), and keep-alive memory (KAM), for example. KAM is a persistent or non-volatile memory that may be used to store various operating variables while a CPU of the control module 50 is powered down. KAM can clear when power is lost.

Computer-readable storage devices or media may be implemented within the control module 50 using any number of known memory devices, such as PROMS (programmable read-only memory), EPROMS (electrically PROM), EEPROMS (electrically erasable PROM), flash memory, or another electric, magnetic, optical, or combination memory devices capable of storing data some of which represent executable instructions used by the control module 50. In the exemplary embodiment, the executable instructions enable the control module 50 to: (1) collect data from the position sensor 54, (2) interpret the data as a particular user gesture, (3) associate that user gesture with a desired control of the side door 14, and (4) command the actuator system 62 based on the desired control.

Although not explicitly illustrated, those of ordinary skill in the art could recognize other various functions or components that may be controlled by the control module 50 within various systems and subsystems of the vehicle 10.

In the exemplary embodiment, the authorization sensor 58 communicates with a user device 66 when the user device 66 is within a threshold distance from the vehicle 10. The user device 66 could be carried by the user 22. The user device 66 can be a key fob or smartphone, for example.

The authorization sensor 58 and the user device 66 can communicate, for example, via Bluetooth Low Energy (BLE) communications to provide an indication to the control module 50 that the user device 66 is near the vehicle 10. The authorization sensor 58 can be, for example, a key Bluetooth approach detection sensor that is mounted within a B-pillar applique.

In response to the user 22 being within the threshold distance, the control module 50 may, in some examples, wake the positional sensor 54 by commanding the positional sensor 54 to emit radio waves. In this way, the positional sensor 54 and control module 50 are detecting user gestures only when the user 22 is within the threshold distance from the vehicle. This can help to ensure that an authorized user is making the user gesture. Other users lacking the user device 66 and its associated authorization, would not prompt the control module 50 to begin to detect user gestures.

In response to detecting user device 66 within the threshold distance, the control module 50 can also wake up various vehicle systems including the positional sensor 54, elatches that hold the side door 14 in a closed position, and a battery control module.

After the positional sensor 54 wakes up and detects a gesture from the user 22, the control module 50 can command the actuator system 62 to, for example, reposition the side door 14.

In the exemplary embodiment, the control module 50, in response to receiving a user gesture indicating that the user 22 desires the side door 14 to move to an open position, can transition the elatch to unlatch the side door 14 from the vehicle body, and then command the actuator system 62 to open the door to the position shown in FIG. 1. The actuator system 62 can be a power door hinge.

Figure 3:
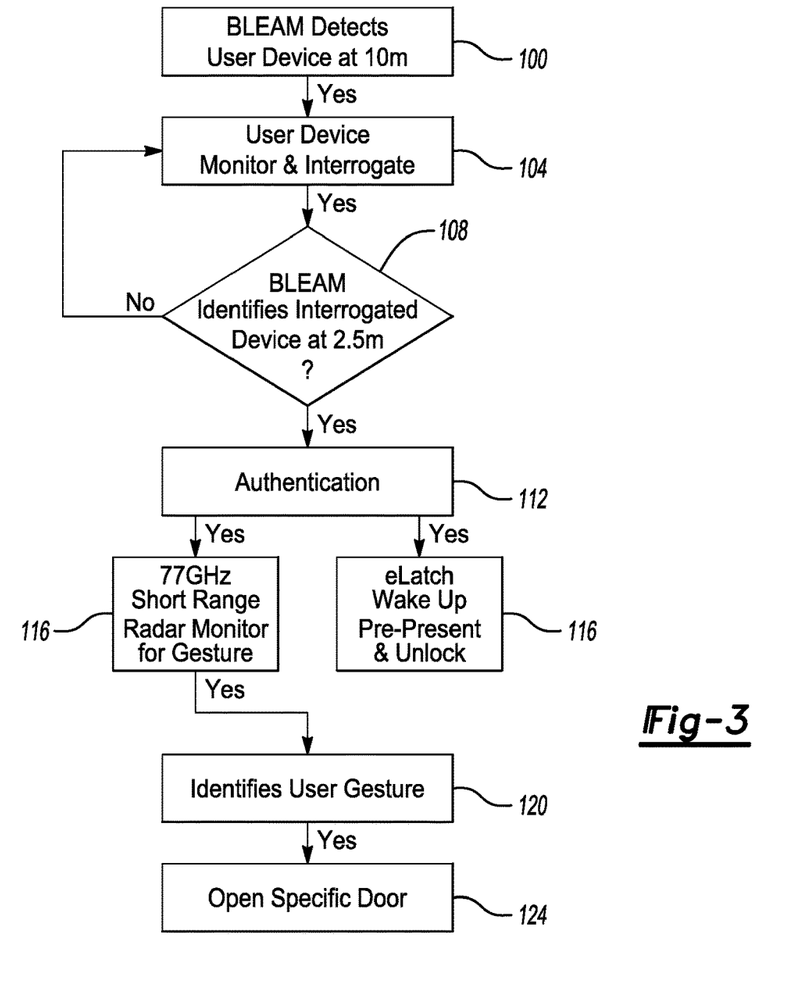
FIG. 3 illustrates the flow of a vehicle closure panel control method according to an exemplary aspect of the present disclosure.

With reference now to FIG. 3, a flow of an example method utilized in connection with the vehicle 10 of FIGS. 1 and 2 begins at a step 100 where a Bluetooth low energy transceiver antenna module (BLEAM) provides the authorization sensor 58. At the step 100, the BLEAM scans to detect if the user device 66 is within a first threshold distance from the vehicle 10. Here, the first threshold distance is 10 meters.

If the user device 66 is detected within 10 meters, the user device 66 is then monitored and interrogated at a step 104. At the step 104, the user device 66 is being monitored and interrogated to determine, among other things, whether the user device 66 is moving closer to the vehicle 10 such that the user device is within a second threshold distance from the vehicle 10.

The method then moves to a step 108 where the BLEAM identifies the interrogated device having moved closer to the vehicle 10. Here the second threshold distance is 2.5 meters, so the method moves to the step 108 after the user device 66 has moved to within 2.5 meters or closer to the vehicle 10.

From the step 108, the method moves to the step 112 where the method authenticates the user device. Authentication occurs, in this example, when a pre-authenticated device (e.g., key fob, phone as key, recognized Bluetooth device) is within 2.5 meters of the side door 14.

In response to the authentication at the step 112, the method moves to the steps 116 and 120. At the step 116, the control module 50 wake up the positional sensor 54 so that the positional sensor 54 can begin to monitor for a user gesture.

At the step 120, the control module 50 can also wake up elatches that hold the side door 14 in a closed position. The control module 50 may not unlock all the elatches of the vehicle 10. Instead, if the user 22 is on a driver side of the vehicle 10, both a front driver side door and a rear driver side door can have associated elatches unlocked. The position of the user 22 can be assessed based on the position of the user device 66.

Similarly, there may be positional sensors 54 configured to monitor a driver side of the vehicle 10 for user gestures and other positional sensors 54 configured to monitor a passenger side of the vehicle 10 for user gestures. If the user 22 is on the driver side, the control module 50 may wake up the positional sensors 54 that monitor the driver side.

In the method, after waking the positional sensor 54 at the step 116 and detecting a user gesture, the control module 50 identifies the user gesture. This identification occurs at the step 120.

Figure 3A:
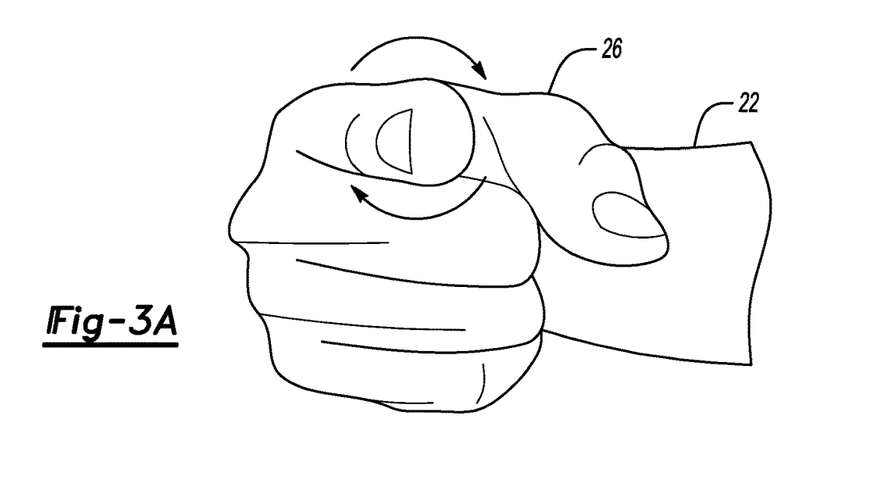
FIG. 3A illustrates an exemplary type of user gesture detected in the method of FIG. 3.

The user gesture identified in the exemplary method of FIG. 3 is the user gesture shown in FIG. 3A where the user's hand 26 has its index finger pointed toward the vehicle 10. In this position, the user's hand 26 is in a pointing position. The user gesture identification requires not only the pointing position, but also the index finger being rotated in a clockwise (relative to the user 22) circular motion while the user's hand 26 is within 100 to 350 millimeters of the positional sensor 54. The control module 50 recognizes this user gesture as a command to open the side door 14. Thus, at the step 124, the method commands power hinges or other type of the actuator system 62 to move the side door 14 from a less open position to a more open position.

Detection of the user gesture may be further refined such that the index finger must move in a circular fashion where the circle has a diameter of from 30 to 200 millimeters before the control module 50 will recognize the motion as a user gesture. A certain speed of the index finger movement may also be required. For example, the index finger may need to move 180° about the approximate circle in no more than 100 to 2000 milliseconds in order for the control module 50 to recognize the motion as a user gesture.

Depending on a position of the user 22, the control module 50 can operate the front door or the rear door in response to the user gesture. For example, if the user 22 is near the door handle of a rear side door when making a user gesture, the control module 50 may command the rear side door to operate in response to that user gesture. If instead, the user 22 is closer to a door handle of the side door 14 when making the same user gesture, the control module 50 instead commands the side door 14 to operate in response to that user gesture.

Figure 4:
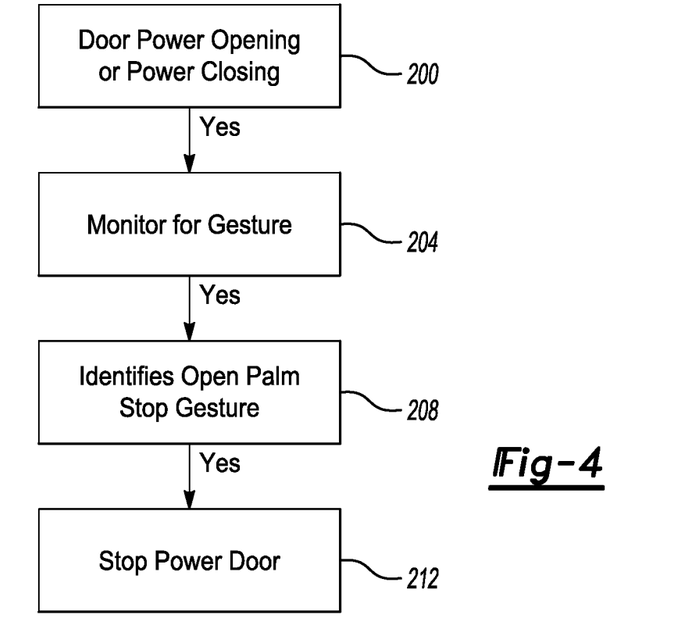
FIG. 4 illustrates the flow of a vehicle closure panel control method according to another exemplary embodiment of the present disclosure.

With reference now to FIG. 4, another exemplary method begins at a step 200 where the side door 14 is moving from a less open position to a more open position or moving from a more open position to a less open position. If yes, the method moves to the step 204 where the positional sensor 54 monitors for a user gesture.

Figure 4A:
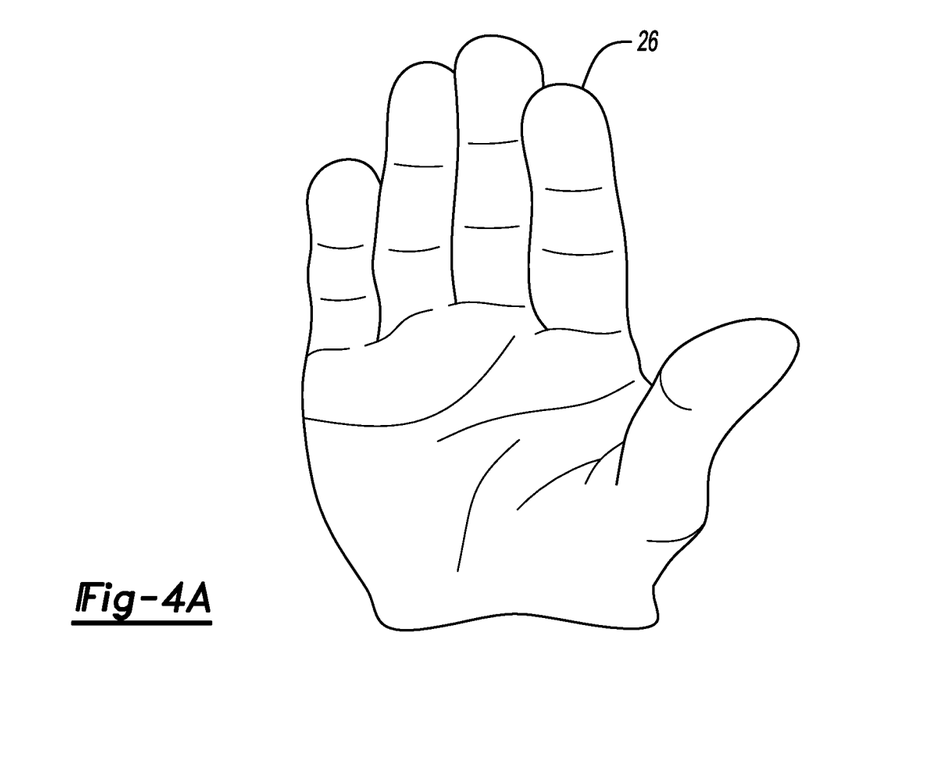
FIG. 4A illustrates another exemplary type of user gesture used in the method of FIG. 4.

At the step 208, the positional sensor 54 detects the user gesture shown in FIG. 4A, which is the user's hand 26 in an open position with an open palm facing the vehicle 10. The hand positioning shown in FIG. 4A may need to be made within 100 millimeters of the positional sensor 54 in order for the control module 50 to recognize the hand positioning shown in FIG. 4A as a user gesture.

The control module 50 interprets the user gesture shown in FIG. 4A as a command from the user 22 that the user 22 desires movement of the side door 14 to stop. Accordingly, at the step 212, the control module 50 commands the actuator system 62 to stop movement of the side door 14.

Figure 5:
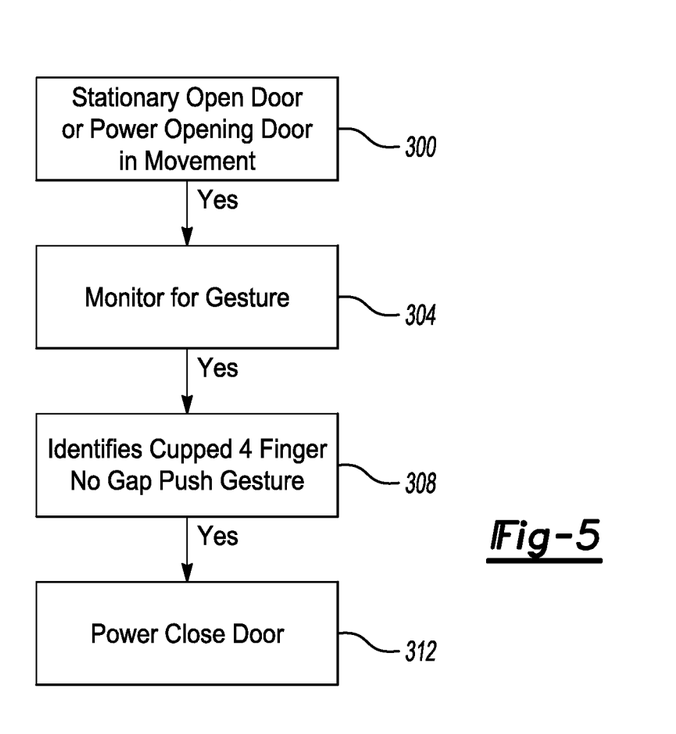
FIG. 5 illustrates the flow of a vehicle closure panel control method according to another exemplary embodiment of the present disclosure.

With reference now to FIG. 5, another exemplary method begins at a step 300 where the side door 14 is stationary in an open position or in a closed position. At the step 304, the method utilizes the positional sensor 54 to monitor for a user gesture made by the user 22. At the step 308, the method identifies the user gesture shown in FIG. 5A, which is the user's hand 26 having four fingers cupped. The hand positioning shown in FIG. 5A may need to be made within 100 to 350 millimeters of the positional sensor 54 in order for the control module 50 to recognize the hand positioning shown in FIG. 5A as a user gesture. The hand position shown in FIG. 5A can be considered the user's hand 26 being in a cupped position.

Figure 5A:
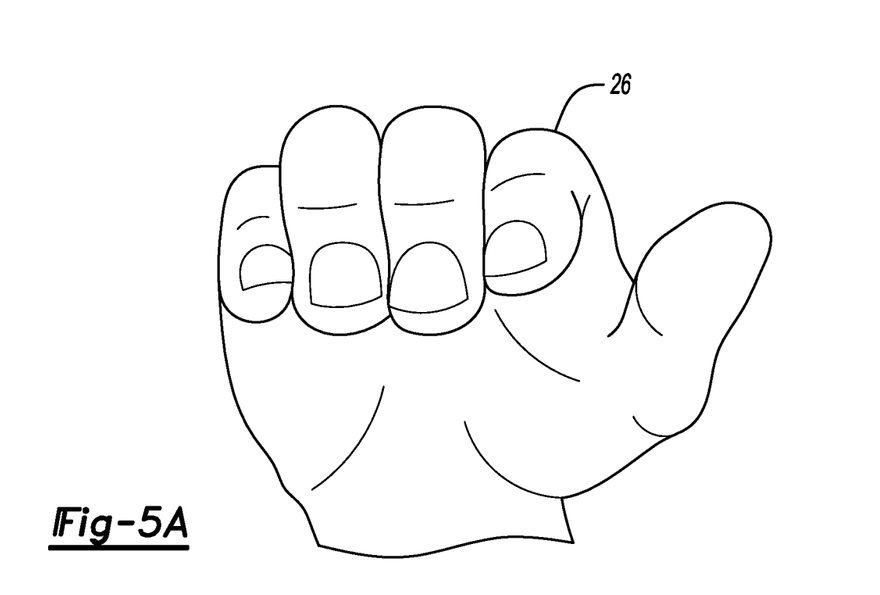
FIG. 5A illustrates another exemplary type of user gesture used in the method of FIG. 5.

In response to the detection of the gesture shown in FIG. 5A, the control module 50 issues a command to the actuator system 62 at a step 312. The command closes the side door 14.

Figure 6:
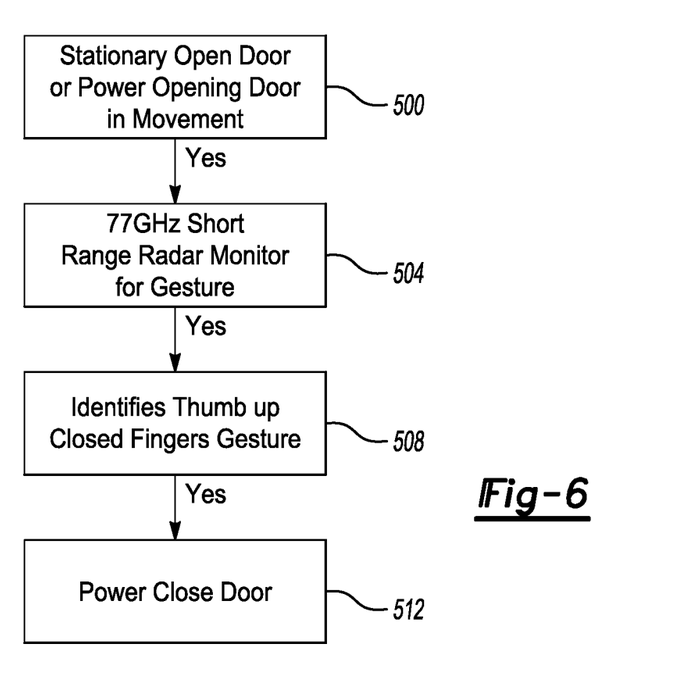
FIG. 6 illustrates the flow of a vehicle closure panel control method according to another exemplary embodiment of the present disclosure.

With reference now to FIG. 6, another method begins at a step 500 where the side door 14 is stationary in an open position, or the side door 14 is moving from a less open position to a more open position. If true, the method moves to the step 504 where the method uses the positional sensor 54 to monitor for a user gesture. At a step 508, method identifies the user gesture shown in FIG. 6A, which is the user's hand 26 moved into a thumbs up position. The hand positioning shown in FIG. 6A may need to be made within 100 to 350 millimeters of the positional sensor 54 in order for the control module 50 to recognize the hand positioning shown in FIG. 6A as a user gesture.

Figure 6A:
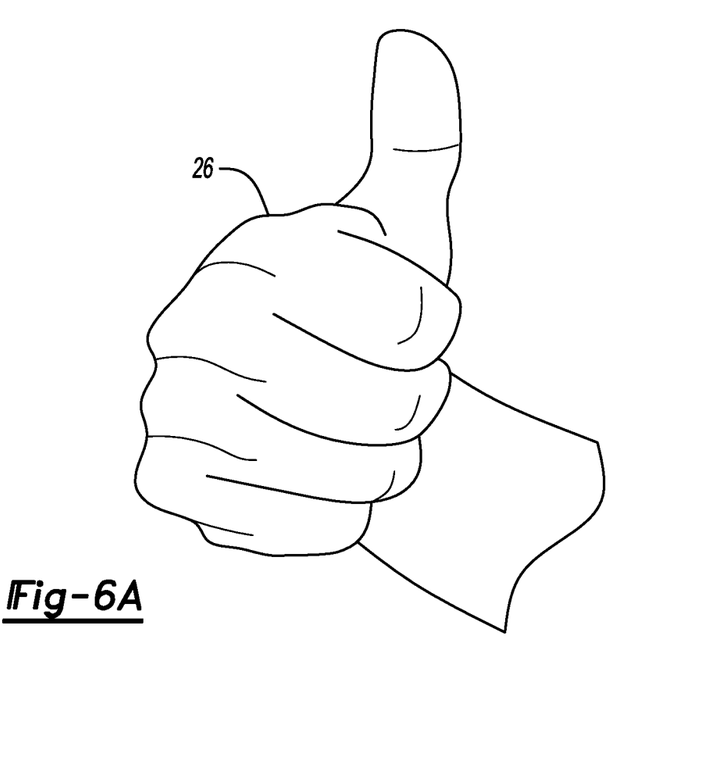
FIG. 6A illustrates another yet exemplary type of user gesture used in the method of FIG. 6.

In response to the thumbs up position shown in FIG. 6A, the control module 50 issues a command to that locks the side door 14. If the side door 14 is not yet closed, control module 50 may further issue a command to the actuator 62 to close the side door 14. In some examples, the gesture shown in FIG. 6A can prompt the control module 50 to issue a command that closes and locks all the doors of the vehicle 10.

In some examples, the vehicle 10 can include an indicator, such as a light emitting diode, that illuminates in a blue color when the positional sensor 54 is searching for a gesture made by the user 22. In response to the control module 50 interpreting a detected gesture through the positional sensor 54, the LED could transition to green. Other indicators could be utilized in other examples.

Some features of the disclosed embodiments include using one or more positional sensors to detect a position of a user. The position of the user is used to assess whether the user is making a user gesture. If the user is making a user gesture, a closure panel of a vehicle can be controlled in response to the user gesture. The user gesture controlled closure panel can, among other things, enable the user to open the closure panel when grasping a physical handle of the closure panel is difficult.

In the past, camera systems and proximity detection systems have been used to assess user commands. These systems do not incorporate position sensors and are, among other things, more complex and less able to assess gesture distinguishing details.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle closure panel control assembly, comprising:
    a closure panel;
    an actuator system that can move the closure panel back and forth between an open position and a closed position;
    a positional sensor that senses a position of at least part of a user to detect a user gesture; and
    a control module that commands the actuator system to control movement of the closure panel, wherein the commands from the control module to the actuator system are based at least partially on the user gesture, wherein the control module is configured to command the actuator system to move the closure panel to the open position in response to a user gesture of a first type, to move the closure panel to the closed position in response to a user gesture of a second type, and to stop movement of the closure panel in response to a user gesture of a third type.

2. The vehicle closure panel control assembly of claim 1, wherein the commands from the control module to the actuator system change based on the user gesture.

3. The vehicle closure panel control assembly of claim 1, wherein the closure panel is a door.

4. The vehicle closure panel control assembly of claim 1, wherein the actuator system includes at least one power hinge.

5. The vehicle closure panel control assembly of claim 1, wherein the positional sensor emits radio waves.

6. The vehicle closure panel control assembly of claim 1, wherein the positional sensor includes a RADAR sensor.

7. The vehicle closure panel control assembly of claim 6, wherein the RADAR sensor is a short-range RADAR sensor in the 77 gigahertz band.

8. The vehicle closure panel control assembly of claim 1, wherein the first type, the second type, and the third type are each a different type of hand gestures.

9. The vehicle closure panel control assembly of claim 1, wherein the user gesture of the first type is a movement of a hand of a user when the hand is in a pointing position, wherein the user gesture of the second type is the hand in a cupped position, wherein the user gesture of the third type is the hand with an open palm.

10. A vehicle comprising the vehicle closure panel control assembly of claim 1.

11. The vehicle closure panel control method of claim 10, wherein the closure panel is a side door of a vehicle.

12. The vehicle closure panel control method of claim 10, further comprising sensing the gesture using RADAR.

13. The vehicle closure panel control method of claim 10, further comprising sensing the gesture using a short-range RADAR sensor in the 77 gigahertz band.

14. The vehicle closure panel control method of claim 10, wherein the controlling includes moving the closure panel using at least one power hinge.

15. A vehicle closure panel control method, comprising:
    sensing a gesture made a user by detecting a position of at least a portion of the user; and
    controlling a position of a closure panel in response to the gesture,
    wherein the controlling includes moving the closure panel to a more open position in response to a user gesture of a first type, moving the closure panel to a less open position in response to a user gesture of a second type, and stopping movement of the closure panel in response to a user gesture of a third type.

16. The vehicle closure panel control method of claim 15, wherein the first type of user gesture is a movement of a hand of a user when the hand is in a pointing position.

17. The vehicle closure panel control method of claim 15, wherein the second type of user gesture type is a hand of a user in a cupped position.

18. The vehicle closure panel control method of claim 15, wherein the third type of user gesture is a hand with an open palm.

* * * * *

UNITED STATES PATENT AND TRADEMARK OFFICE
CERTIFICATE OF CORRECTION

PATENT NO. : 10,921,900 B1
APPLICATION NO. : 16/672032
DATED : February 16, 2021
INVENTOR(S) : Linden et al.

It is certified that error appears in the above-identified patent and that said Letters Patent is hereby corrected as shown below:

In the Claims

Column 7, Line 42, Claim 1 should read:
1. A vehicle closure panel control assembly, comprising:
    a closure panel;
    an actuator system that can move the closure panel back and forth between an open position and a closed position;
    a positional sensor that senses a position of at least part of a user to detect a user gesture; and
    a control module that commands the actuator system to control movement of the closure panel, wherein the commands from the control module to the actuator system are based at least partially on the user gesture, wherein the control module is configured to command the actuator system to move the closure panel to the open position in response to a user gesture of a first type, to move the closure panel to the closed position in response to a user gesture of a second type, and to stop movement of the closure panel in response to a user gesture of a third type.

Column 8, Line 1, Claim 2 should read:
2. The vehicle closure panel control assembly of claim 1, wherein the commands from the control module to the actuator system change based on the user gesture.

Column 8, Line 4, Claim 3 should read:
3. The vehicle closure panel control assembly of claim 1, wherein the closure panel is a door.

Column 8, Line 6, Claim 4 should read:
4. The vehicle closure panel control assembly of claim 1, wherein the actuator system includes at least one power hinge.

Column 8, Line 9, Claim 5 should read:
5. The vehicle closure panel control assembly of claim 1, wherein the positional sensor emits radio waves.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,921,900 B1

Column 8, Line 11, Claim 6 should read:
6. The vehicle closure panel control assembly of claim 1, wherein the positional sensor includes a RADAR sensor.

Column 8, Line 13, Claim 7 should read:
7. The vehicle closure panel control assembly of claim 6, wherein the RADAR sensor is a short-range RADAR sensor in the 77 gigahertz band.

Column 8, Line 16, Claim 8 should read:
8. The vehicle closure panel control assembly of claim 1, wherein the first type, the second type, and the third type are each a different type of hand gestures.

Column 8, Line 19, Claim 9 should read:
9. The vehicle closure panel control assembly of claim 1, wherein the user gesture of the first type is a movement of a hand of a user when the hand is in a pointing position, wherein the user gesture of the second type is the hand in a cupped position, wherein the user gesture of the third type is the hand with an open palm.

Column 8, Line 25, Claim 10 should read:
10. A vehicle comprising the vehicle closure panel control assembly of claim 1.

Column 8, Line 27, Claim 11 should read:
11. A vehicle closure panel control method, comprising:
    sensing a gesture made by a user by detecting a position of at least a portion of the user; and
    controlling a position of a closure panel in response to the gesture,
    wherein the controlling includes moving the closure panel to a more open position in response to a user gesture of a first type, moving the closure panel to a less open position in response to a user gesture of a second type, and stopping movement of the closure panel in response to a user gesture of a third type.

Column 8, Line 29, Claim 12 should read:
12. The vehicle closure panel control method of claim 11, wherein the closure panel is a side door of a vehicle.

Column 8, Line 31, Claim 13 should read:
13. The vehicle closure panel control method of claim 11, further comprising sensing the gesture using RADAR.

Column 8, Line 34, Claim 14 should read:
14. The vehicle closure panel control method of claim 11, further comprising sensing the gesture using a short-range RADAR sensor in the 77 gigahertz band.

Column 8, Line 37, Claim 15 should read:
15. The vehicle closure panel control method of claim 11, wherein the controlling includes moving the closure panel using at least one power hinge.

CERTIFICATE OF CORRECTION (continued)
U.S. Pat. No. 10,921,900 B1

Column 8, Line 48, Claim 16 should read:
16. The vehicle closure panel control method of claim 11, wherein the first type of user gesture is a movement of a hand of a user when the hand is in a pointing position.

Column 8, Line 51, Claim 17 should read:
17. The vehicle closure panel control method of claim 11, wherein the second type of user gesture type is a hand of a user in a cupped position.

Column 8, Line 54, Claim 18 should read:
18. The vehicle closure panel control method of claim 11, wherein the third type of user gesture is a hand with an open palm.